(12) United States Patent
Cox et al.

(10) Patent No.: US 7,239,639 B2
(45) Date of Patent: Jul. 3, 2007

(54) SYSTEM AND METHOD FOR DYNAMICALLY CONSTRUCTING PACKET CLASSIFICATION RULES

(75) Inventors: Dennis J. Cox, Round Rock, TX (US); Alexander I. Tomlinson, Austin, TX (US); Joseph Dempsey, Austin, TX (US); Matthew C. Laswell, Austin, TX (US); Scott Strentzsch, San Antonio, TX (US); Stephen Egbert, McKinney, TX (US); Terry G. Ahnstedt, Austin, TX (US); Brian C. Smith, Fort Worth, TX (US)

(73) Assignee: 3Com Corporation, Marlborough, MA (US)

( * ) Notice: Subject to any disclaimer, the term of this patent is extended or adjusted under 35 U.S.C. 154(b) by 925 days.

(21) Appl. No.: 10/034,435

(22) Filed: Dec. 27, 2001

(65) Prior Publication Data

US 2003/0123452 A1 Jul. 3, 2003

(51) Int. Cl.
*H04L 12/28* (2006.01)

(52) U.S. Cl. ............................ 370/395.43
(58) Field of Classification Search ......... 370/395.43, 370/395.31, 395.52, 392, 389, 401, 397, 370/471, 349, 395.32, 412, 432; 709/238, 709/240
See application file for complete search history.

(56) References Cited

U.S. PATENT DOCUMENTS

| | | | |
|---|---|---|---|
| 651,636 A | 6/1900 | McCarthy | 52/54 |
| 5,101,402 A | 3/1992 | Chiu et al. | 709/224 |
| 5,648,965 A | 7/1997 | Thadani et al. | 370/241 |
| 5,742,772 A | 4/1998 | Sreenan | 709/226 |
| 5,787,253 A | 7/1998 | McCreery et al. | 709/231 |
| 5,835,726 A | 11/1998 | Shwed et al. | 709/229 |
| 5,845,267 A | 12/1998 | Ronen | 705/40 |
| 6,028,842 A | 2/2000 | Chapman et al. | 370/235 |
| 6,091,709 A | 7/2000 | Harrison et al. | 370/235 |
| 6,104,700 A | 8/2000 | Haddock et al. | 370/235 |
| 6,108,700 A | 8/2000 | Maccabee et al. | 709/224 |
| 6,172,990 B1 | 1/2001 | Deb et al. | 370/474 |
| 6,212,559 B1 | 4/2001 | Bixler et al. | 709/221 |
| 6,262,983 B1 | 7/2001 | Yoshizawa et al. | 370/389 |
| 6,286,030 B1 | 9/2001 | Wenig et al. | 709/203 |

(Continued)

OTHER PUBLICATIONS

PacketShaper Enterprise Solutions; Packeteer, Inc. (www.packeteer.com).

(Continued)

*Primary Examiner*—Chi Pham
*Assistant Examiner*—Alexander O. Boakye
(74) *Attorney, Agent, or Firm*—Hamilton & Terrile, LLP

(57) ABSTRACT

A system and method classifies packets with a programmably fixed network processor program and dynamically updated data structures. The network processor program selects predetermined packet field values of the packets transmitted across the network and classifies the packets by matching one or more packet field values with a data structure. New packet classifications are dynamically created by updating the data structure to associate one or more predetermined packet field values with the new packet classification. For instance, a parse tree program extracts packet header information and matches the packet header information to the data structure. A pattern tree data structure provides longest prefix matches and an ordered tree data structure provides combination matches so that classification of arbitrary Boolean combinations of extracted header fields can be formed.

22 Claims, 1 Drawing Sheet

U.S. PATENT DOCUMENTS

| | | | |
|---|---|---|---|
| 6,292,489 B1 | 9/2001 | Fukushima et al. | 370/401 |
| 6,320,848 B1 | 11/2001 | Edwards et al. | 370/255 |
| 6,341,130 B1 * | 1/2002 | Lakshman et al. | 370/389 |
| 6,418,125 B1 | 7/2002 | Oran | 370/266 |
| 6,452,915 B1 | 9/2002 | Jorgensen | 370/338 |
| 6,463,067 B1 * | 10/2002 | Hebb et al. | 370/413 |
| 6,539,425 B1 | 3/2003 | Stevens et al. | 709/220 |
| 6,542,466 B1 | 4/2003 | Pashtan et al. | 370/235 |
| 6,560,233 B1 | 5/2003 | Hatanaka et al. | 370/401 |
| 6,577,628 B1 | 6/2003 | Hejza | 370/392 |
| 6,590,885 B1 | 7/2003 | Jorgensen | 370/338 |
| 6,594,246 B1 | 7/2003 | Jorgensen | 370/338 |
| 6,628,617 B1 | 9/2003 | Karol et al. | 370/237 |
| 6,628,629 B1 | 9/2003 | Jorgensen | 370/322 |
| 6,636,481 B1 | 10/2003 | Yamaguchi et al. | 370/230 |
| 6,640,248 B1 | 10/2003 | Jorgensen | 709/226 |
| 6,651,096 B1 | 11/2003 | Gai et al. | 709/223 |
| 6,678,248 B1 | 1/2004 | Haddock et al. | 370/235 |
| 6,680,922 B1 | 1/2004 | Jorgensen | 370/328 |
| 6,687,247 B1 * | 2/2004 | Wilford et al. | 370/392 |
| 6,697,368 B2 | 2/2004 | Chang et al. | 370/395.1 |
| 6,711,165 B1 | 3/2004 | Tzeng | 370/392 |
| 6,714,517 B1 | 3/2004 | Fawaz et al. | 370/236 |
| 6,732,168 B1 | 5/2004 | Bearden et al. | 709/223 |
| 6,772,223 B1 | 8/2004 | Corl et al. | 709/238 |
| 6,801,530 B1 | 10/2004 | Brandt et al. | 370/392 |
| 6,804,240 B1 | 10/2004 | Shirakawa et al. | 370/392 |
| 6,822,940 B1 | 11/2004 | Zavalkovsky et al. | 370/237 |
| 6,826,147 B1 | 11/2004 | Nandy et al. | 370/229 |
| 6,831,893 B1 | 12/2004 | Ben Nun et al. | 370/235 |
| 6,865,602 B1 | 3/2005 | Nijemcevic et al. | 709/223 |
| 6,871,233 B1 | 3/2005 | Bearden et al. | 709/226 |
| 6,892,233 B1 | 5/2005 | Christian et al. | 709/223 |
| 7,068,661 B1 | 6/2006 | Watt et al. | 370/395.31 |
| 2002/0052941 A1 | 5/2002 | Patterson | 709/223 |
| 2002/0069274 A1 | 6/2002 | Tindal et al. | 709/223 |
| 2002/0085560 A1 | 7/2002 | Cathey et al. | 370/392 |
| 2002/0099854 A1 | 7/2002 | Jorgensen | 709/249 |
| 2002/0107908 A1 | 8/2002 | Dharanikota | 709/203 |
| 2002/0152303 A1 | 10/2002 | Dispensa | 709/224 |
| 2002/0191622 A1 | 12/2002 | Zdan | 370/401 |
| 2002/0194369 A1 | 12/2002 | Rawlins et al. | 709/238 |
| 2003/0005144 A1 | 1/2003 | Engel et al. | 709/235 |
| 2003/0014627 A1 | 1/2003 | Krishna et al. | 713/153 |
| 2003/0028624 A1 | 2/2003 | Hasan et al. | 709/220 |
| 2003/0067903 A1 | 4/2003 | Jorgensen | 370/338 |
| 2003/0076855 A1 | 4/2003 | Chamberlain | 370/447 |
| 2004/0022237 A1 | 2/2004 | Elliott et al. | 370/356 |
| 2004/0088646 A1 | 5/2004 | Yeager et al. | 715/500 |
| 2004/0098447 A1 | 5/2004 | Verbeke et al. | 709/201 |

OTHER PUBLICATIONS

Network-Based Application Recognition, Release 12.0(5)XE2, 12.1(1)E and 12.1(2)E, Cisco Systems (www.cisco.com).

* cited by examiner

SYSTEM AND METHOD FOR DYNAMICALLY CONSTRUCTING PACKET CLASSIFICATION RULES

TECHNICAL FIELD OF THE INVENTION

This invention relates generally to computer networks, and more specifically relates to a system and method for dynamically constructing rules to classify packets transmitted across a network.

BACKGROUND OF THE INVENTION

Packet based computer networks transmit information in packets that are formatted with a sequence of well-known header fields that direct the packets through the network. For example, a TCP/IP packet on an Ethernet network consists of three parts, an Ethernet header, an IP header, and a TCP header. The Ethernet header in turn includes three well-known fields. The source address, the destination address and the "EtherType" field. From the EtherType field the format of subsequent data may be determined. For instance, if the EtherType field indicates the packet contains an IP datagram, packet field values for the IP datagram allow the determination of source address, destination address and protocol fields. The protocol field identifies the type of data that follows, such as TCP, UDP, etc. The packet header information is used by network computer devices to route data through the network.

Network computing devices perform routing and switching functions based upon computations performed on the packet field values. For instance, router software on a general purpose computer sends packets to different output network interfaces based upon computations performed from header packet field values. To improve network transmission speeds, special purpose devices are used to perform simple, well specified functions at high speeds that direct network traffic. For instance, network appliances such as routers, switches and firewalls perform fixed functions based on one or more fixed fields using hard wired instructions that process packets in a substantially more rapid manner than software functions. As an example, a router computes the output interface for a packet based on the packet's destination address in the IP header.

Although hard wired instructions, such as those defined in application specific integrated circuits (ASICs) provide for rapid processing of packets through a network, ASIC designs are typically inflexible since the hard wired instructions generally cannot be reprogrammed through software. Thus, for example, networks that rely on routers have difficulty implementing services which generally call for varying packet processing behaviors since router functions are generally hard wired into ASICs. For instance, internet service providers that provide customer access to the Internet over router based networks have difficulty deploying services that provide for individual handling of packets related to specific customers.

In order to aid in the deployment of services to packet based networks, programmable network processors have been developed for use in network appliances such as routers, switches and firewalls. Network processors run a software program that determines the processing of packets but handles packets in a rapid manner by performing certain functions specific to processing of network packets through hardware implementations. For example, network processors support table look-up operations with hard wired instructions allowing routing functions that rely on table look-ups to occur at rates much faster than available through general purpose processors. Network processors support programs that look at packet field values and perform table look-up operations to determine the processing for the packet. For example, a program on a network processor classifies a packet by using information from IP source and destination address field values. The fields examined and the combination of the fields are determined by the program loaded on the network processor.

One difficulty with network processors is that loading a program on a network processor takes several seconds and brings the network processor off line so that packets are either dropped or passed through the network processor without processing. Thus, as an example, a network processor used in a router will not route packets while a new program is loaded. In systems that use fixed combinations of fields to process packets, the programming limitation of network processors does not present a substantial difficulty since the program running on the network processor need not change very often. However, in order to provide services to packet based networks, such as with the programmable network nodes disclosed in U.S. patwnt application Ser. No. 09/928,771, filed Aug. 13, 2001, entitled "System and Method for Programming Network Nodes," which is incorporated herein by reference, the program running on the network processor may have to change more often.

Another difficulty with programming network processors is that newly added network processor programs must continue to process packets at line rates to avoid degrading network operations. For instance, if a program on a network processor fails to process packets at line rates, packets will be dropped and network performance severely degraded. The addition of new classifiers to a network processor program has an unpredictable effect on the speed at which the program operates on the network processor. Thus, especially in the case of complex packet processing behavior implementations, the reliability of new network processor programs is difficult to predict.

SUMMARY OF THE INVENTION

Therefore, a need has arisen for a system and method which dynamically constructs rules in a network processor while the network processor remains on line.

A further need has arisen for a system and method which provides flexibility for network processors to enable a variety of packet processing behaviors in a reliable manner at line speed.

A further need has arisen for a system and method which allows construction of packet classifiers in a dynamic manner that supports deployment of services to a packet based network.

In accordance with the present invention, a system and method is provided that substantially eliminates or reduces disadvantages and problems associated with previously developed systems and methods for classifying packets transferred across a packet based network. A program selects predetermined packet field values and classifies packets by matching one or more packet field values with a data structure. New packet classifications are created by updating the data structure to associate the one or more predetermined packet field's values with the new packet classification without changing the program.

More specifically, a network processor runs a programmably fixed program that supports dynamic creation of packet classifiers through exploitation of high speed network processor table look-up operations. The dynamic classifiers are arbitrary Boolean combinations of values from packet fields extracted from network packet headers by the program of the network processor. Packet processing behaviors are added as new rules by modifying tables within a data structure while maintaining the underlying network processing code unchanged.

In one embodiment, the network processor program parses packets in a predetermined order encoded as a parse tree on the network processor. Each node of the parse tree identifies packet fields examined and each branch of the parse tree indicates the value of extracted fields. The network processor examines packet field values according to the parse tree programming to extract and save useful information. When a leaf node of the parse tree is reached, a transmit function is called that uses one or more of the captured field values to compute a classification destination identification (DID) for the packets.

The packet classification computed by the transmit function results from the matching of relevant field values with a data structure to compute the destination identification. The transmit functions use network processor table look-up functions to perform matching between pattern trees and ordered virtual trees. The pattern tree match identifies the longest match value and provides a virtual handle for use in the ordered virtual tree. The transmit function then matches the virtual handles against the ordered virtual tree data structure to compute the destination identification for classification of the packet. The pattern trees match values extracted from pattern fields and the ordered virtual trees match combinations identified with virtual handles from the pattern tree. In this manner, arbitrary Boolean combinations of extracted header fields can be formed to provide high speed and fine grained classification rules which are dynamically added or deleted through modification of table values without changing the parse tree program and causing disruption of service.

In the operation of one embodiment, the network processor parsing program and data structure run on a pattern processor to classify packets transmitted through a network. For instance, a programmable node includes a pattern processor and system interface that allows prioritized rules to classify packet flows, such as to enable a service. The rules are sets of properties of packets identified by an associated identifier. The packet values for enabling the rules are extracted from packet fields by the parsing program. Rules are installed without a need for modifying the parsing program by instead updating the data structure pattern trees and ordered virtual trees. The dynamic insertion and deletion of values from pattern trees and ordered virtual trees are performed without interrupting network processor operations.

The present invention provides a number of important technical advantages. One important technical advantage is that rules are dynamically constructed in a network processor for classification of packets while the network processor is on-line. The dynamic construction of rules by updating and modifying the data structure while leaving the network processor program unchanged avoids service interruption while allowing classification rules to involve arbitrary Boolean combinations of header fields. The programmably fixed parsing program of the network processor allows the creation of rules at a rate of several thousand rules per second on current generation network processor hardware since the fixed program extracts desired field values from packets in a consistent manner and enables changes to packet processing behaviors by modifying data structures instead of network processor programming.

Another important technical advantage of the present invention is that packet processing behavior rules are rapidly constructed and used on a programmable node to classify packets by arbitrary Boolean combinations of header fields without risk of slowing down network processor operations below line speed. In addition to bring a network processor off line, reprogramming of a network processor to handle new classifiers may have a varied impact on network processor performance. Thus, by maintaining a programmably fixed network processor program that handles new classifications with updates to data structures instead of changing the program, the present invention provides for dynamic construction of packets processing behaviors without risk of slowing down network processor operations. The "fixed" network processor program may be carefully tested to ensure that it maintains line rates with any combination of rules.

Another important technical advantage of the present invention is that programmable nodes may update services dynamically and on a real time basis with minimal impact on the performance of a packet based network. Such services may rely on classification rules involving arbitrary Boolean combinations of header fields, such as directing identified packet flows from a source to a destination at a predetermined service level or with other desired packet processing behaviors, including blocking undesired flows like pornography or Napster, and forwarding identified flows to predetermined queues or paths.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the FIGURES, like numerals being used to refer to like and corresponding parts of the various drawings.

Services are difficult to deploy in packet based networks since the service specific handling of packets, requires the inspection of packet header fields and, in some cases, data. For instance, some types of service specific handling are specific routing, firewall functions based on content, bandwidth shaping to delay, prioritize or drop packets, and MPLS LERs to add tags to packets. One alternative for performing services on a packet based network is to hard wire instructions for the service at nodes in the packet based network. However, hard wired instructions are difficult to deploy and change. Software based services generally do not operate at fast enough line speeds unless enhanced by specialized hardware. Network processors offer the advantage of combined software and hardware designs that specialize in processing packets. However, changing the program on a network processor to enable a new packet processing behavior generally requires taking the network processor off line for several seconds, thus making reprogramming of the network processor an impractical alternative when seeking to deploy services on a rapid and real time basis.

Figure 1:
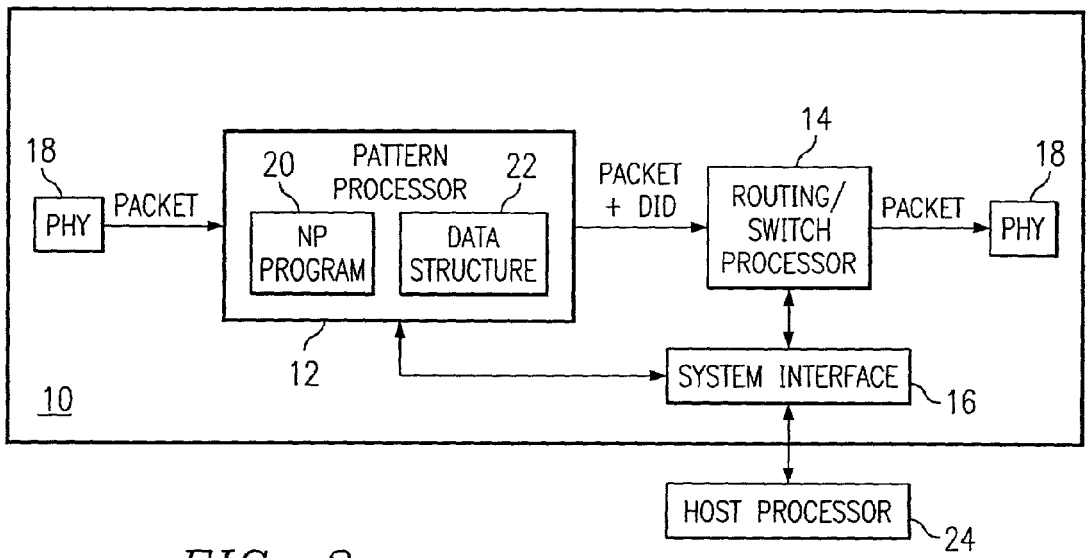
FIG. 1 depicts a block diagram of a programmable node that provides services to a packet based network.

Referring now to FIG. 1, a block diagram depicts a programmable node that uses network processors to dynamically create rules for providing services to packet based networks. A programmable node 10 includes one or more network processors that classify, modify, shape and route packets through the packet based network. Network processors are functionally divided into three parts, a pattern processing (PP) function 12, a routing\switch processing (RSP) function 14 and a system interface (SI) function 16. These three functions may be handled by a single network processor chip or separate chips as depicted by FIG. 1.

Packets received from a physical interface 18 are passed to pattern processor 12. Physical interface 18 may include interfaces for Ethernet, Sonet, ATM, RPR (802.17), TDM (T1, T3, DS3, E3) and other types of physical networks that transmit Internet traffic. Pattern processor 12 classifies the packet according to a programmed set of rules and sends the packets along with a classification destination identifier (DID) to routing\switch processor 14. The routing\switch processor 14 uses the destination identifier, which indicates the result of the classification step, to modify, shape and route the packet to an appropriate output physical interface 18. System interface 16 installs new rules and programs in the pattern processor 12 and routing\switch processor 14.

The dynamic construction of rules for packet processing behaviors are provided with a network processor program 20 and data structure 22. A host processor 24 programs the network processor program 20 and data structure 22 through system interface 16 to perform rules that compute destination identifications associated with a packet based on information in the packet header and then modify, shape or route the packets according to the destination identification through routing\switch processor 14. Network processor program 20 is programmably fixed so that rules are dynamically constructed with table modifications without having to change network processor program 20, thus avoiding bringing the programmable node 10 off line. Instead, network processor program 20 extracts predetermined packet field values in a programmed but fixed manner with classifiers dynamically created by updating data structure 22 instead of network processing program 20. The fixed nature of network processor program 20 exploits the table look-up operations available in network processors to maintain high speeds and uses dynamic classifiers of arbitrary Boolean combinations of well known header field values of the network packets by updating data structure 22. Some examples of header fields extracted include: MPLS label, time to live, EXP bits and BS; Ethernet source, destination MAC address, EtherType, 802.1p priority, 802.1q VLAN identifier and 802.1q CFI; UDP source/dest port and length; ICMP type, code, type-specific data; IP type of service, dont fragment flag, protocol, time to live; and TCP flags (SYN, FIN, ACK, URG, PSH, RSI) and length window size.

Host processor 24 prioritizes service rules so that programmable node 10 classifies packet flows for processing though the network. The prioritized rules used by host processor 24 are a set of properties of the packet that identify packets and associate packets with processing behaviors. As an example, a processor rule might identify all packets with a predetermined TCP destination port and destination IP address so that those identified packets may be processed through the network in a desired manner, such as with a predetermined service level, bandwidth allocation or path. Alternatively, a service may block transfer of such identified packets, such as with pornography protection or undesirable programs such as Napster. The processing rules provided by host processor 24 have an associated identifier, such as a 20-bit or even 64-bit identifier that allows a large number of packet processing behaviors to be programmed.

Figure 2:
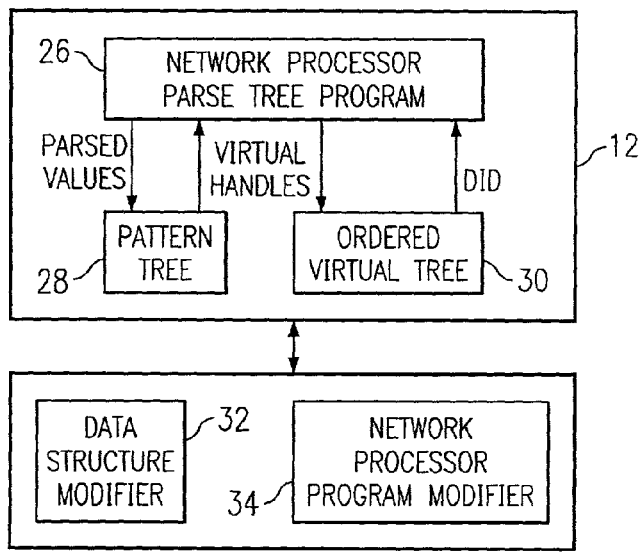
FIG. 2 depicts a block diagram of a pattern processor for classifying packets with a programmably fixed parse tree program.

Referring now to FIG. 2, a block diagram depicts one embodiment of a static network processor program that allows new packet behavior rules to be installed on a programmable node 10. A network processor parse tree program 26 is a static program that remains unchanged even while new packet behavior rules are installed, with the new rules implemented through modifications made to a pattern tree data structure 28 and an ordered virtual tree data structure 30. Pattern tree data structure 28 and ordered virtual tree data structure 30 each allow for dynamic insertion and deletion operations without interrupting pattern processor 12's operation. A data structure modifier 32 performs dynamic insertion and deletion operations on pattern tree data structure 28 and ordered virtual tree data structure 30 to implement rules dynamically by modifying data. Network processor program modifier 34 allows changes to network processor parse tree program 26, although such changes generally require that pattern processor 12 be brought off line. Thus, network processor parse tree program 26 is programmably fixed so that during dynamic creation of rules the programmable node 10 remains on line by keeping the program fixed, but the program may be modified if needed by bringing the pattern processor off line.

Pattern trees are tables with one or more entries that represent patterns and contain a bit mask. Network processors, such as those available from Agere, have special hardware for using pattern trees. When a pattern tree is searched for a value, the longest match found is used with the bit mask indicating which bits of the pattern are significant. For example, a search for the value 192.208.12.14 in the following pattern tree would return three matches, rows 1, 3 and 4, with row 3 having the longest match of 32 bits.

| Pattern       | Mask  | ID |
|---------------|-------|----|
| 192.208.12.0  | FFF0  | 1  |
| 10.0.0.0      | F000  | 2  |
| 192.208.12.14 | FFFF  | 3  |
| 0.0.0.0.      | 0000  | 4  |

Data structure modifier 32 updates the pattern tree with patterns, masks and identifiers known as virtual handles. For instance, to dynamically create a service rule associated with an IP address, data structure modifier 32 inserts the IP address as a pattern in pattern tree data structure 28. Although the present embodiment uses a pattern tree data structure, alternative embodiments use other data structures that implement longest prefix matches.

Ordered virtual tree data structure 30 supports dynamically constructed rules by allowing combinations of multiple patterns in a single search. Network processors, such as those available from Agere, have special hardware for using ordered virtual trees, also known as OV trees. Ordered virtual trees define the order in which rules are matched and are typically used to implement access control lists such as those found in a firewall. The ordered virtual tree is searched in order from top downward until a first match is made at which time the search is complete. In contrast, pattern trees find a longest prefix match with a search of the entire pattern tree to determine the most specific match, whereas ordered virtual trees need search only for the first match. Although the present embodiment uses an ordered virtual tree data structure, alternative embodiments use other data structures that implement first matches.

Figure 3:
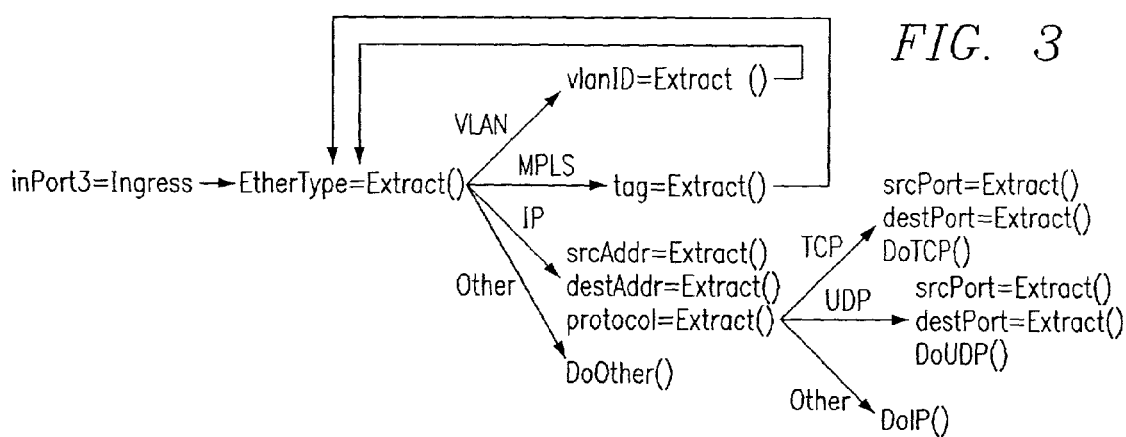
FIG. 3 depicts one embodiment of a parse tree for extracting packet field values from an Ethernet packet.

Referring now to FIG. 3, an example of a parse tree is depicted that shows a parsing order for Ethernet packets. The parsing order is programmable into network processor parse tree program 26. The parse tree depicts how the pattern processor 12 running the network processor parse tree program 26 will examine Ethernet packet fields, with each node in the parse tree listing packet fields examined and each branch indicating the value of a particular field. The parse tree parses packets from the most general header information to more specific header information and extracts useful pieces of header field values, such as source address or VLANID and stores these values for use. When a leaf node of the parse tree is reached, a transmit function is called that uses the captured header field values to compute a destination identification for the packet.

For example, the parse tree depicted by FIG. 3 parses the indicated Ethernet packet header information to extract the ether type, follow the IP branch, extract the source address and destination address, follow the TCP branch, extract the source port and destination port and then call the "Do TCP" transmit function. The TCP transmit function uses the captured field values to compute a destination identification for the packet by matching the relevant field values with the data structure. For instance, the captured field values are matched against pattern trees to extract corresponding virtual handles based on the longest prefix match and then the virtual handles are matched against the ordered virtual tree to compute the destination identification. Thus, as depicted in FIG. 2, the network processor parse tree program 26 matches parsed values against pattern tree data structure 28 to obtain virtual handles and then matches the virtual handles against ordered virtual tree data structure 30 to obtain destination identification values. The destination values are provided along with the packet to the routing\switch processor 14, which handles the packets according to a processing behavior associated with the destination identification programmed from host processor 24 to system interface 16 into routing\switch processor 14.

Advantageously, new rules for packet processing behaviors, such as rules that enable a service, are added by modifying the pattern tree data structure 28 and ordered virtual tree structure 30 while the underlying network processor parse tree program 26 remains unchanged. For example, with the destination address illustrated by FIG. 3, in order to add a rule to "match all packets sent to 192.208.12.*, port 80" an entry is created in a TCP_DESTADDR pattern tree for the destination address of 192.208.12.* and another entry is created in the TCP_DESTPORT pattern tree for the destination port 80. The combination of the destination address and destination port are found with the TCP OV Tree for the combination of the destination address and the destination port. The pattern trees and ordered virtual trees are encoded dynamically with conventional techniques, such as those described in "A Tree-Based Packet Routing Table for Berkley Unix," by K. Sklower, Proceedings of the 1991 Winter USENIX Technical Conference, January, 1991. Network processors available from various manufacturers provide various levels of support for functions such as table look ups. The pattern trees and ordered virtual trees are initialized with a single entry matching so that if no other matches occur, the initialized entries identify a default destination identification associated with unmatched packets.

Although the present invention has been described in detail, it should be understood that various changes, substitutions and alterations can be made hereto without departing from the spirit and scope of the invention as defined by the appending claims.

What is claimed is:

1. A system for providing a service to a packet based network, comprising:
   a processor having instructions to extract predetermined header information from a packet and further having instructions to perform table look-ups with the header information;
   a first data structure that provides a longest match value for processor table look-ups;
   a second data structure that provides a first match value for processor table look-ups of combinations of longest match values;
   wherein said processor is further operable to use said longest match value and said first match value to determine a service for said packet.

2. The system of claim 1 further comprising a data structure modifier operable to dynamically update said first and second data structures to create a new packet classification.

3. The system of claim 2 wherein the new packet classification relies on the predetermined header information to avoid changes to the processor program.

4. The system of claim 1 wherein the first data structure comprises a pattern tree.

5. The system of claim 1 wherein the second data structure comprises a ordered virtual tree.

6. The system of claim 1 wherein the processor instructions comprise a parse tree that extracts header field values.

7. The system of claim 6 wherein the parse tree comprises plural nodes and plural branches, the nodes representing packet fields and the branches representing values for the packet fields.

8. The system of claim 6 wherein the leaf nodes of the parse tree comprise the table look-up instructions.

9. The system of claim 6 wherein the header field values comprise one or more of Internet Protocol source address and destination address.

10. The system of claim 6 wherein the header field values comprise one or more of Transfer Control Protocol source port and destination port.

11. The system of claim 1 wherein the processor comprises pattern processor.

12. The system of claim 11 further comprising a route/switch processor in communication with the pattern processor and operable to modify, shape and route the packet according to the classification.

13. A method for servicing packets transmitted across a network, the method comprising:
   selecting predetermined packet field values from the packets;
   classifying the packets by matching one or more packet field values with a data structure; and
   dynamically creating a new packet classification by modifying the data structure to associate one or more of the predetermined packet field values with the new packet classification; and
   selecting a service for said packet using said new packet classification.

14. The method of claim 13 wherein selecting predetermined packet field values comprises extracting packet field values from packet headers with a pattern processor having a program.

15. The method of claim 14 wherein dynamically creating a new packet classification further comprises modifying the data structure and leaving the pattern processor program fixed.

16. The method of claim 15 wherein the pattern processor program comprises a parse tree having plural nodes including a leaf node, the method further comprising:
   calling a function at the leaf node, the function performing table look-ups from the data structures to determine a packet classification.

17. The method of claim 16 wherein performing table look-ups comprises:
   looking up a longest match for packet header values; and
   looking-up a first match for combinations of the longest match table look-up results.

18. The method of claim 13 wherein the data structure comprises an ordered virtual tree.

19. The method of claim 13 wherein the data structure comprises a pattern tree.

20. A system for servicing packets comprising:
   a network processor having programmably fixed instructions that select values from predetermined packet fields;
   a data structure that associates one or more packet field values with a classification; and
   a data structure modifier interfaced with the data structure and operable to modify the data structure to define one or more modified classifications, each modified classification associated with one or more packet field values;
   wherein said network processor is operable to use said modified classification to select a service for said packet.

21. The system of claim 20 wherein the programmably fixed instructions comprise a parse tree having plural nodes.

22. The system of claim 20 wherein the data structure comprises:
   a pattern tree that determines a longest match for a packet field value; and
   an ordered virtual tree that determines a first match for a combination of longest matches.

* * * * *